US006968998B2

(12) United States Patent
Daniel et al.

(10) Patent No.: US 6,968,998 B2
(45) Date of Patent: Nov. 29, 2005

(54) SYSTEM AND METHOD FOR ENSURING PAYMENT FOR SOLD OR LEASED EQUIPMENT

(75) Inventors: Robert Daniel, Carol Stream, IL (US); Joel Zupancic, Joliet, IL (US); Kenneth Falk, Mount Prospect, IL (US); Joseph Abreu, San Marcos, CA (US); Jason Coe, Temecula, CA (US)

(73) Assignee: M&R Printing Equipment, Inc., Glen Ellyn, IL (US)

( * ) Notice: Subject to any disclaimer, the term of this patent is extended or adjusted under 35 U.S.C. 154(b) by 0 days.

(21) Appl. No.: 10/323,715

(22) Filed: Dec. 18, 2002

(65) Prior Publication Data

US 2004/0118915 A1 Jun. 24, 2004

(51) Int. Cl.[7] .................................................. G06K 7/01

(52) U.S. Cl. ................... 235/382.5; 235/382; 235/383; 235/380; 340/5.28

(58) Field of Search ............................ 235/382.5, 382, 235/380, 383; 340/571, 5.28; 705/14, 39, 705/40

(56) References Cited

U.S. PATENT DOCUMENTS 4,814,901 A * 3/1989 Onishi et al. ................. 386/46
5,072,103 A * 12/1991 Nara .......................... 235/492
5,563,586 A * 10/1996 Baum et al. ................. 340/3.5
5,572,004 A 11/1996 Raimann
5,580,310 A 12/1996 Orus et al.
5,752,128 A * 5/1998 Yamashita ................... 399/80
5,902,983 A 5/1999 Crevelt et al.
5,999,748 A * 12/1999 Nomura et al. ............... 396/87
6,078,907 A * 6/2000 Lamm ......................... 705/40
6,078,957 A * 6/2000 Adelman et al. ........... 709/224
6,114,960 A * 9/2000 Gilmour ..................... 340/571
6,227,972 B1 * 5/2001 Walker et al. ................ 463/25
6,347,738 B1 2/2002 Crevelt et al.
6,473,500 B1 * 10/2002 Risafi et al. ........... 379/144.01
6,487,401 B2 * 11/2002 Suryanarayana et al. ... 455/406
2001/0037260 A1 11/2001 Kim

* cited by examiner

*Primary Examiner*—Steven S. Paik
(74) *Attorney, Agent, or Firm*—Wallenstein Wagner & Rockey, Ltd.

(57) ABSTRACT

A limited electronic system and method are provided for automatically shutting down equipment when an account associated with purchased or leased equipment falls into arrears. The system includes a control center (connected to a machine) with a screen display, means for entering a code, and a controller. The controller has a disabling program that shuts down the machine after a predetermined interval, such as time. Because the program automates the shut-down when no (timed) interval is in place, the user must obtain a "re-set code" from a non-user—i.e., the financing entity, the equipment supplier, the account manager, or other entity—and enter it into the system to set the next interval so the machine remains operational. The re-set code is generated by the machine. The non-user at a location remote from the machine receives or generates parallel re-set codes. The method involves: (a) activating the program, (b) assessing the payment status of the account, and (c) when the account is paid, releasing the re-set code to the user for manual entry it into the control center. If the account is in arrears, the re-set code is not released to the user, and no entry of a new re-set code, the program causes the machine to shut-down.

33 Claims, 5 Drawing Sheets

SYSTEM AND METHOD FOR ENSURING PAYMENT FOR SOLD OR LEASED EQUIPMENT

TECHNICAL FIELD

This invention relates generally to a system and method for ensuring payments for equipment and/or machinery are made on accounts. More particularly, the present invention relates to a system and a method that automatically renders equipment—purchased or leased on credit—unusable when payments due on an incremental basis for the equipment are not timely made.

BACKGROUND

In the sale of equipment, companies such as lenders typically lose significant capital when purchasers fail to make timely payments. While the purchaser is delinquent in its payments, the purchaser has possession of the equipment and can productively use the equipment to its benefit. At the same time, however, although the lending company may penalize the purchaser by charging a late finance fee for the missed payment, the lending equipment company has no certainty of when—or whether—the purchaser will pay.

Several patents directed to the gaming industry disclose systems and methods for "pre-paying a set sum" to be used for playing a gaming machine or placing a wager. For example, in U.S. Pat. Nos. 5,902,983 and 6,347,738, the latter being a continuation, Crevelt et al. disclose an electronic funds transfer (EFT) system for gaming machines. The gaming machines include apparatus necessary for sending requests to and receiving authorizations from the EFT system. The requests for credit are limited to a pre-set amount, so that when a player uses an EFT transfer to obtain playing credit, the credit will be limited to no more than a specified amount. In practice, the player inserts his or her ATM card (debit card), keys in a PIN number, requests playing credit, and receives the pre-set amount of credit which can be converted to "plays" on the gaming machine.

In U.S. Pat. No. 5,580,310, Orus et al. disclose gaming machines having mechanical counters according to the regulations. Grafted onto the mechanical counters are electronic payment mechanisms that work on the basis of a chip card. The electronic payment mechanism diverts a certain number of links of the units of the machine to enable wagers to be placed and payments to be made through the chip card, without the receiving or issuing of tokens and, preferably, without the modifying of the contents of the TOTAL IN and TOTAL OUT counters. A downgraded version modifies the contents of these counters, and the balance of the feeder box containing the coins is obtained by modifying the formula used to compute this balance.

These systems and methods, however, are targeted for the gaming industry where an ATM card or a chip card is used directly or in conjunction with the gaming machine. Moreover, neither discloses the monitoring of the timeliness of payments made on an account. Nor do these references disclose or suggest a method that inactivates equipment when payments are not made or are late.

Thus, there exists a need for a system and method that monitors a credit account from the sale or leasing of equipment and that renders the purchased or leased equipment unusable when the account falls in arrears.

SUMMARY OF THE INVENTION

The present invention is directed to a system and method for ensuring payments are made on a timely basis on credit accounts for the sale or lease of equipment. The system can be used worldwide and needs not be located near a particular central facility. Specifically, the lender can be in one country, while the purchaser of the equipment can be in another country.

To that end, in one aspect of the invention, a system is provided for ensuring that payments are made on a timely and regular basis for equipment. Particularly suitable for use by equipment suppliers, financing groups, and account managers, the system provides for the automatic shut-down of the purchased or leased equipment, including machines, after a predetermined interval when an account from the purchase or lease of the machine is in arrears. The system has a control center connected to the machine with a display screen for displaying a message, a user interface for entering a code into the control center, a controller for controlling the operation of the machine, and means for checking the payment status of the account. The user interface is a keypad or touch screen affixed to the machine or alternatively tethered to the machine. The controller has a timed shut-down program for rendering the machine unusable after an interval when the account is found to be delinquent. A device in the controller monitors the interval, including the date for which the shut-down is scheduled to become activated. The controller also has an internal code generator for generating a re-set code that the user needs to enter into the control center to initiate a new interval and keep the machine operational. Additionally, one aspect of the controller provides for comparing the re-set code entered into the keypad by the user/operator to the re-set code generated by the code generator. For checking on the payment status of the account, at least one of a telephone, email, facsimile, or a designated website on the Internet are included in the system. In short, the re-set code acts as a keep to key the machine running for a certain, preselected interval (time, revolutions, operations, etc.).

In another aspect of the invention, a method is provided for ensuring that payments are current and timely made to an account associated with the purchase or lease of equipment. The method automatically renders unusable the operating functions of the machine in a user's custody upon an unpaid balance of the account. The machine, such as a printing machine, is connected to a timed shut-down system, substantially as described above. The system has a control center equipped with a controller and a user interface for entering a code into the system. The controller has a code generator for generating a system-generated re-set code, a disabling program for shutting the machine down at the end of a preselected interval, and means for comparing a user-entered re-set code against the system-generated re-set code. The disabling program shuts down the machine when no timed interval is in place. The method comprises: (a) activating the disabling program to initiate a preselected initial interval associated with the account; (b) upon a paid status of the account, releasing a re-set code from a location remote from the machine; (c) entering the re-set code into the user interface to set a new interval; and repeating steps (b)–(c) to keep the machine operational.

In yet another aspect of the invention, a method is provided for automatically shutting down equipment in a user's custody when payment is not made to an account associated with the purchase or lease of the equipment. The equipment, such as a printing machine, is connected to a shut-down system having a control center that is substantially as described above. The control center includes a user interface for entering a code and a controller having a code generator and a shut-down program for shutting the machine down at the end of the timed interval unless a code is entered into the control center within a defined time frame. The method includes: (a) activating the shut-down program to initiate an interval; (b) at a defined point during the interval, determining that the account has a paid status; (c) depending upon the paid status of the account, releasing a code selected from the group consisting of (i) a re-set code when the account has a balance due for initiating a new interval and (ii) a final code when the account has a zero balance due for deactivating the disabling the program; (d) entering the code into the user interface; and, (e) if the code entered in step (d) was a re-set code, repeating steps (b)–(d) until the account has a zero balance due. In one embodiment, the interval is time.

In a further aspect, a method is provided for ensuring that payments are timely made on an account associated with the purchase or lease of a machine by automatically shutting down the machine when the account falls into arrears. The machine is connected to a control center of a shut-down system comprising a user interface for entering a code and a controller. The controller is equipped with a disabling program awaiting activation for triggering a timed sequence shut-down, a code generator, and means for monitoring a timed interval preceding the shut-down. The method comprises: (a) activating the disabling program to shut the machine down after an interval associated with the account; (b) transmitting a re-set code generated by the code generator to a non-user at a location remote from the machine; (c) at a defined point in the timed interval, triggering the timed sequence shut-down unless a code is entered into the user interface. The code, which is one of a re-set code and a final code, is obtained from the non-user upon the account having a paid status for the timed interval. The non-user relinquishes the code when advised that the account is current for the time frame associated with the timed interval.

In each of the above systems, the controller generates a warning (e.g., generated on screen or audio) before shut-down is scheduled to alert owners/operators that the timed interval is drawing to an end. Such warnings serve as reminders to those responsible for paying. In addition, it is an effort to avoid surprises by a shut-down.

Other aspects of the invention will become apparent when taken in conjunction with the following description and drawings.

BRIEF DESCRIPTION OF DRAWINGS

In the accompanying drawings forming part of the specification.

DETAILED DESCRIPTION

Figure 1:
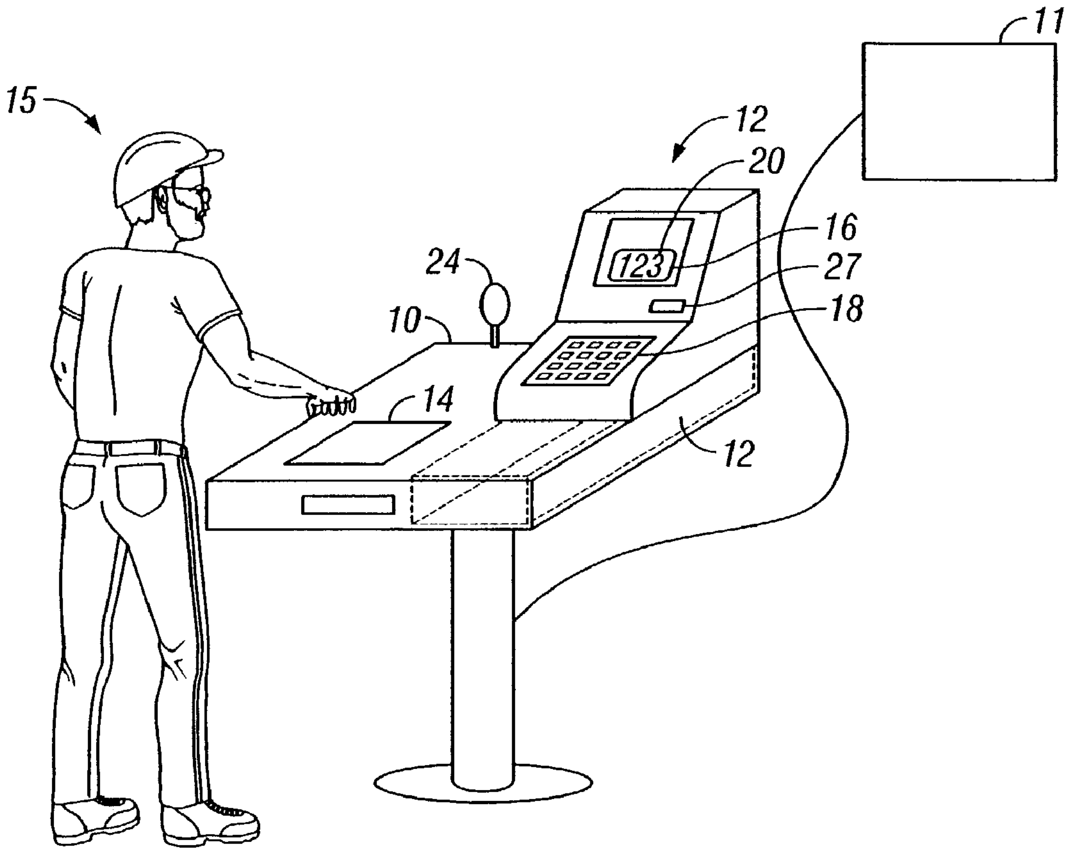
FIG. 1 shows a perspective view of a controller for a machine having a programmable logic controller equipped with a timed shut-down program.

While this invention is susceptible of embodiments in many different forms, there are shown in the drawings and will herein be described in detail preferred embodiments of the invention. The present disclosure is to be considered as an exemplification of the principles of the invention and is not intended to limit the broad aspect of the invention to the embodiments illustrated.

When payments to a credit account are late or overdue at a particular point in a timed interval, the system provides for automatically shutting down the operation of the machine, rendering it inoperable, after the preselected timed interval.

Herein, the term "equipment supplier" means one that manufactures, sells, distributes, or leases machines and equipment, including those giving rise to the credit account.

The term "financing entity" means a bank, a credit union, a savings and loan association, a leasing agency, and any other group that provides financing for the purchase or leasing of machinery or equipment. It is recognized, of course, that the financing entity can be the individual or entity that is the equipment supplier, namely the one that manufactures, sells, distributes, or leases the machines and equipment.

The term "non-user" means an entity other than the user, such as an equipment supplier, the supplier of a control center, or a financing entity according to the definition given above. For example, the non-user can include, among others, the equipment supplier, namely the one that manufactures, sells, distributes, or leases the machines and equipment.

FIG. 1 shows an illustrative example of a controller center/box 10 that includes the timed shut-down system 12. The control center 10 is connected to a machine (designated by reference numeral 11), such as a screen printing machine. Such printing machines are available through M&R Printing Equipment, Inc., Glen Ellyn, Ill., assignee of the present invention. The control center 10 has a total counter 14 for tracking a predetermined parameter 13, expressible as a number or count 17—whether the parameter be revolutions, passes, cycles, output, or input or time in terms of days, weeks, or months, as examples. (See FIG. 5). The count 17 may, e.g., be the total number of revolutions made by a machine (carousel machines) or passes made by the machine (linear-type machines). The control center 10 also includes a display screen 16 for providing messages to a user 15, a key pad 18 for entering a re-set code 20 shown in FIG. 1 on the display screen 16. The display screen 16 is integral with the control center 10; however, in one embodiment, the display screen 16 may be tethered to the control center 10. Similarly, the keypad 18 is integral with the control center 10 but may also be separate from but attached to the control center 10. In a further embodiment, the control box 10 optionally includes at least one audio speaker 24 for providing audio messages to the user 15.

Figure 2:
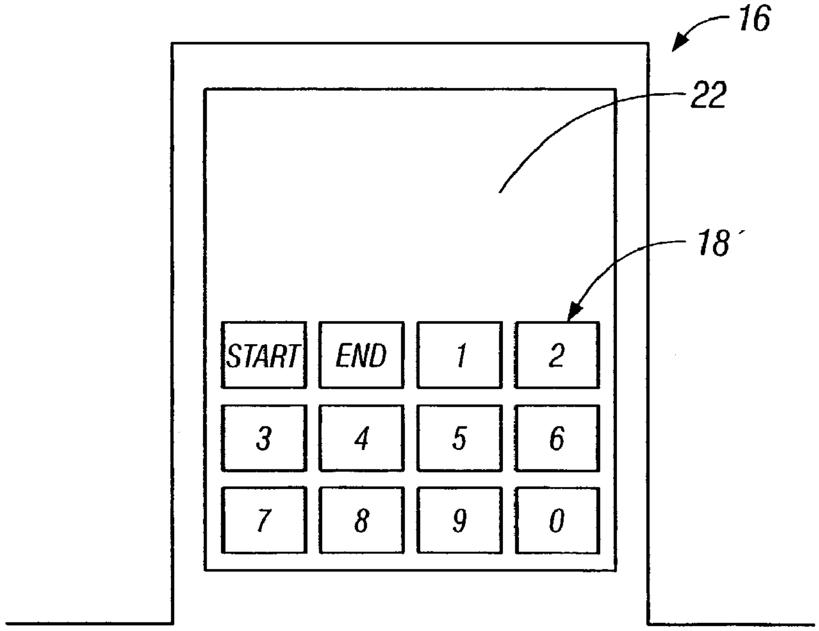
FIG. 2 shows a front elevation view of a touch screen for the machine.

In yet another embodiment, shown in FIG. 2, the display screen 16 consists of a touch screen 22 that incorporates the key pad 18' directly into the screen for easy entry of the re-set code.

Figure 3:
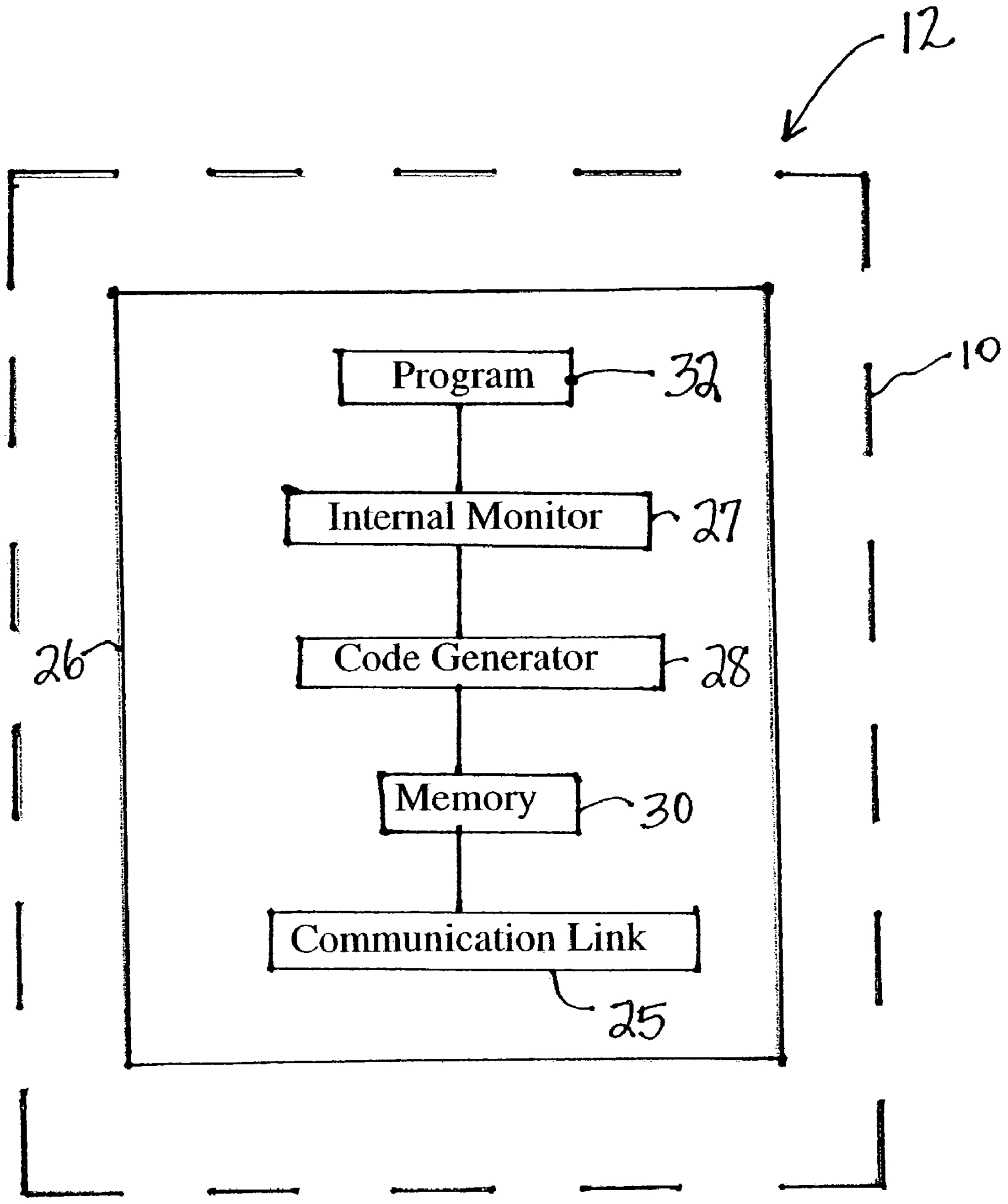
FIG. 3 illustrates schematically several components of the timed shut-down system.

FIG. 3 shows a schematic of the electronic components of the shut-down system 12. In the example discussed, the shut-down system is based upon time so that after a predetermined time period, the system shuts down. As noted above, the system can be based upon a host of other parameters such as revolutions, passes, cycles, output, and input. Specifically, instead of shutting down after 50 days, the equipment may shut-down after making 1,000 products, 6,000 prints, 4,800 cycles, etc. The shut-down system 12 includes a programmable logic controller 26 onboard the control center 10 (shown in FIG. 1), a code generator 28, a memory 30, and a timed shut-down program 32 installed into the controller 26. Optionally, the system includes a communication link to communicate the count 17 or the re-set code. The controller 26 also includes an interval monitor, such as a clock 27 or other suitable device of monitoring the intervals. The controller 26 controls and monitors all operating functions of the machine. The program 32 is a disabling program awaiting activation. After a defined predetermined interval, the controller 26 triggers the program 32 to start the timed sequence that automatically shuts down the machine 11 (shown in FIG. 1). In the preferred embodiment, the predetermined interval is time, e.g., 45 days, 60 days, 90 days, etc., and is preset at the factory where the equipment is made.

Briefly, the timed shut-down system 12 follows the following sequence:

(a) The system 12 is set to shut-down after a predetermined interval.

(b) As the machine runs, the code generator 28 generates a re-set code that is stored in the memory 30. Specifically, a new re-set code is generated with every "pass," "cycle," or "revolution" of the machine. Before the first timed interval ends, the re-set code must be entered into the system to keep the machine running after the first timed interval ends. The re-set code achieves this by setting up a new timed interval. The user 15, however, cannot access this re-set code from the control center 10 itself but must instead obtain the code from a non-user outside the user's facility. The non-user is generally an entity that manufactured, leased, or sold the machine or who financed the purchase of the machine or who oversees the status of the user's credit account for the machine.

(c) The re-set code is sent to, or obtained by, the non-user. Generally, the non-user has a "key" listing of the codes or a parallel running code generator. In such embodiment, at any given point, the non-user can obtain or otherwise determine the re-set code. Alternatively, the re-set code is sent to the non-user via, e.g., the communication link 25, the internet, a phone line, or other suitable means.

(d) Before the first timed interval ends and the machine shuts down, the user is notified, e.g., one or more "warnings" (visible and/or audio), of the imminent shut-down.

(e) To prevent the machine from shutting down at the end of the first timed interval, the user obtains the re-set code from the non-user and before the timed interval ends, manually enters it into the control center 10. Alternatively, if the machine has already shut-down, the user 15 may enter the re-set code to reactivate it, or the non-user can transmit the re-set code directly to the machine. Entry of the re-set code into the system 12 begins a new timed interval for keeping the machine operational. The new timed interval restarts the clock for determining when the account will next be examined for payment status, and if the account is unpaid, the sequence triggered for shutting down the machine.

(f) Steps (b)–(e) repeat until a final code is entered into the system.

Figure 4:
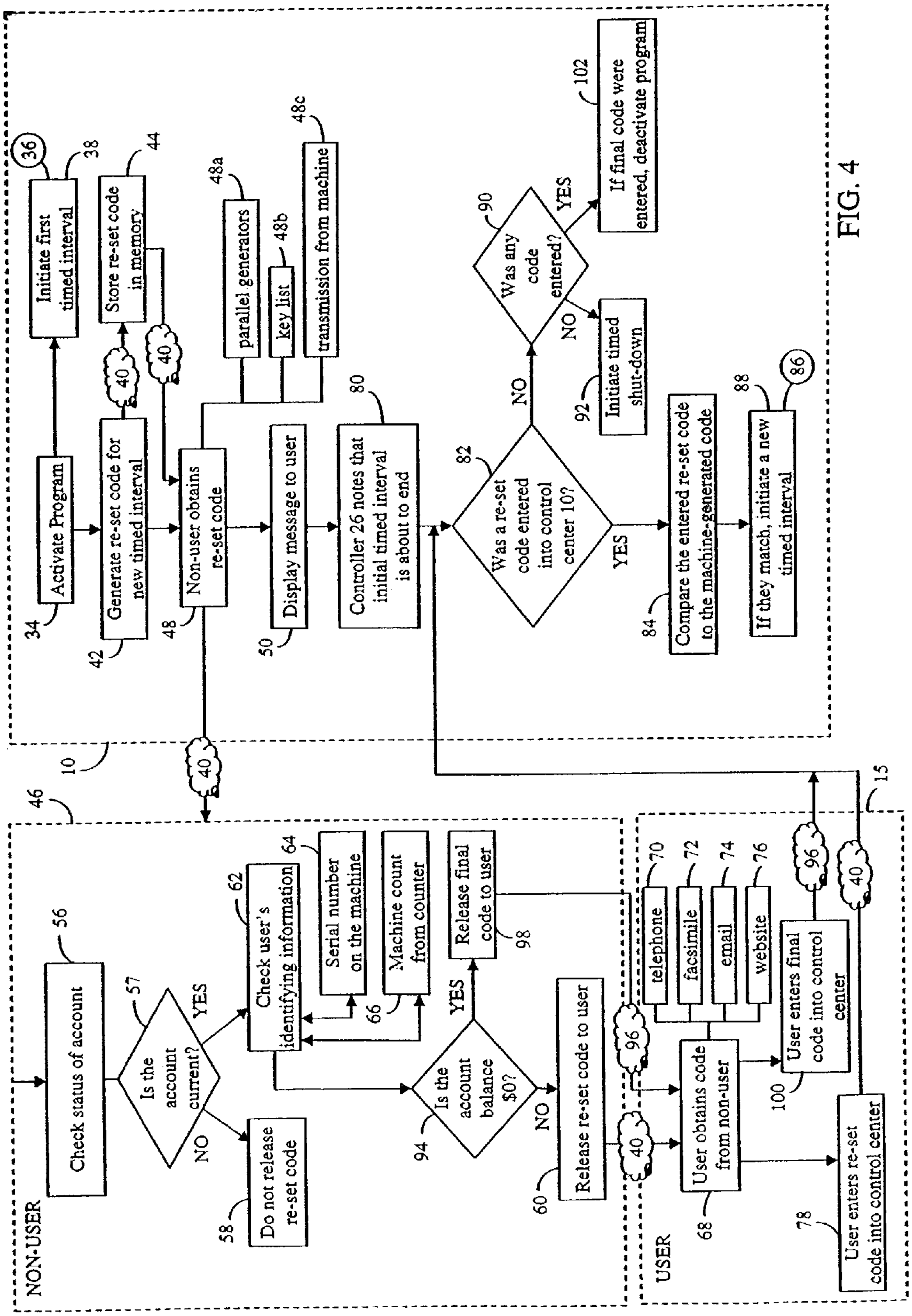
FIG. 4 shows schematically the steps employed in implementing a method in accordance with the invention.

FIG. 4 depicts the particular steps of the present method for ensuring payments are timely made for purchased or leased equipment. The disabling program 32 (shown in FIG. 3) is initially activated at the factory, as indicated by step 34. This disabling program 32 is generally activated at the time of manufacture, before installation at the user's facility. In the alternative, the program 32 can be activated at the user's facility. Preferably, the program 32 is activated by the equipment supplier prior to installation at the user's facility and is "on hold" until the machine is installed. In addition, as discussed later, the program can be reactivated, once deactivated. Thus, if a machine (already paid for), is resold, the disabling program can be activated to ensure payment by the second purchaser. Once activated, a pre-set timed interval 36 is initiated, as indicated by reference numeral 38, and begins to run.

The machine 11 (depicted in FIG. 1) will operate throughout the duration of the timed interval 36. The timed interval 36 extends for a pre-determined time frame, e.g., from 30 to 60 days, or longer or shorter, as needed. Preferably, the timed interval ranges from 45 to 60 days.

Figure 5:
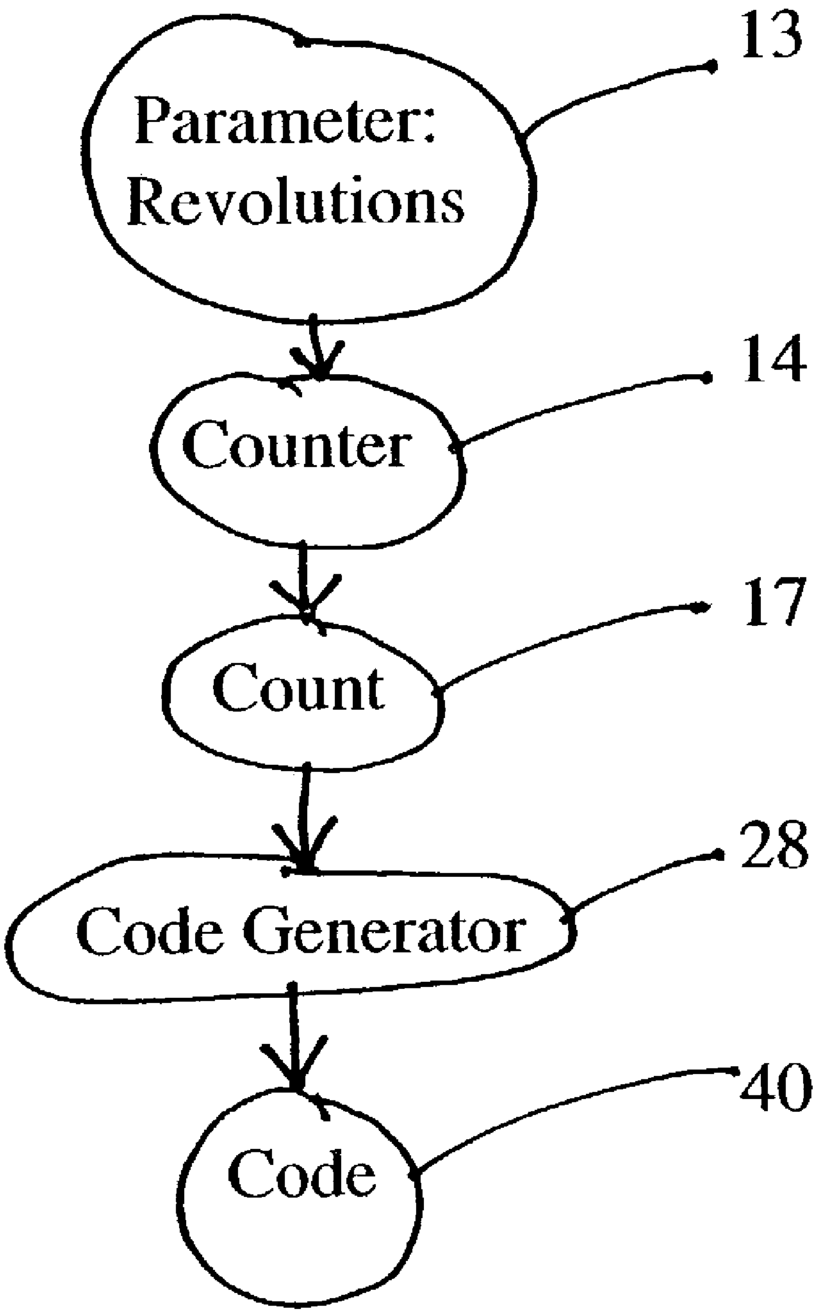
FIG. 5 shows a flow chart of how the code generator generates a re-set code; and, FIG. 6 shows a front view of a display screen with a message, as displayed near the end of the timed interval in accordance with the invention.

FIG. 5 shows how a re-set code is generated. The counter 14 generates a count 17 that keeps track of a predetermined parameter 13, which in the example shown is revolutions. Each count 17 correlates with a rolling digital algorithm. With each revolution made by the machine (or other "counter" type arrangement), the code generator 28 (shown in FIG. 3) generates a new re-set code 40, called herein the "system-generated re-set code." For example, in one embodiment, assume the interval for the machine is 45 days, meaning that the machine will initiate a shut-down if a re-set code is not entered within the 45-day interval. At 43 days, the counter 14 shows a count (17) of 1,621 revolutions; the code generator 28 uses this count to generate a re-set code of 823,161. If this re-set code is entered at this time, it will "re-set" the interval for another 45 days. If the code is not entered and the machine is allowed to operate two more days, the counter 14 shows a count (17) of 1,689 revolutions. The code generator uses this count to generate a re-set code of 937,890. This specific re-set code must be entered to keep the machine operational after a set period of time, for example the 45-day mark. FIG. 4 shows the step of generating a new re-set code as reference numeral 42.

The elements or components associated with the controller, such as the code generator, digital algorithm, disabling program, shut-down sequence, counter or interval monitor, and the means for comparing a user-entered re-set code against the system-generated re-set code can be put into or installed into the system as hardware or software. Creation, construction and installation of these elements or components can be performed by customary and conventional methods.

The re-set code 40 is stored in the memory 30 (memory 30 is shown in FIG. 3), as depicted by reference numeral 44. The system-generated re-set code 40 is detectable by only a non-user 46. The non-user 46 may be any one of an equipment manufacturer or supplier, a supplier of the control center 10, a financing entity that holds the account, or an account manager or a management group retained to oversee payment on the account. The step of the non-user obtaining the re-set code is depicted by reference number 48. The non-user 46 generally has a separate code generator for generating the re-set code or a key list of such re-set codes (shown by reference number 48*a* and *b*, respectively). In another embodiment, the system-generated re-set code 40 is transmitted from the memory 30 to the non-user 46 at a location remote from the machine (reference number 48*c*), where the non-user 46 reads the system-generated re-set code 40 and records that information in its records or stores it in memory. Specifically, the non-user may use a link (e.g., telephone) to securely access the system-generated re-set code, while the user does not have access to such code. In the preferred embodiment, a handshake is performed between the user and non-user or their respective equipment. For example, the user contacts the non-user (phone, web, dedicated line, etc.), the non-user authenticates or confirms the non-user and checks the account, and if all is in order, the non-user communicates or transmits the re-set code to the user. These contacts can be by telephone, through the internet via a modem (at user's location) and a website (non-user) and the re-set codes etc. can be communicated by telephone, email, facsimile, a designated website on the internet or other communication links/lines.

Other information from the control center 10 is typically transmitted to the non-user 46 as well, such as the actual count 17 from the machine of, e.g., units worked on by the machine—i.e., from the counter 14—which may be reported on a real-time basis or the date of last use. Generally, the total count is also sent to the non-user, as it is used for checking the user's ID (for authentication purchases) and used for determining the re-set code. Further information, such as a machine's unique serial number or identification number, may also be communicated to the non-user from the user (via phone or computers) to ensure proper communications, authenticate the parties, check the account status, generate and communicate the re-set code, and to prevent one from overriding, bypassing or hacking the system.

Figure 6:
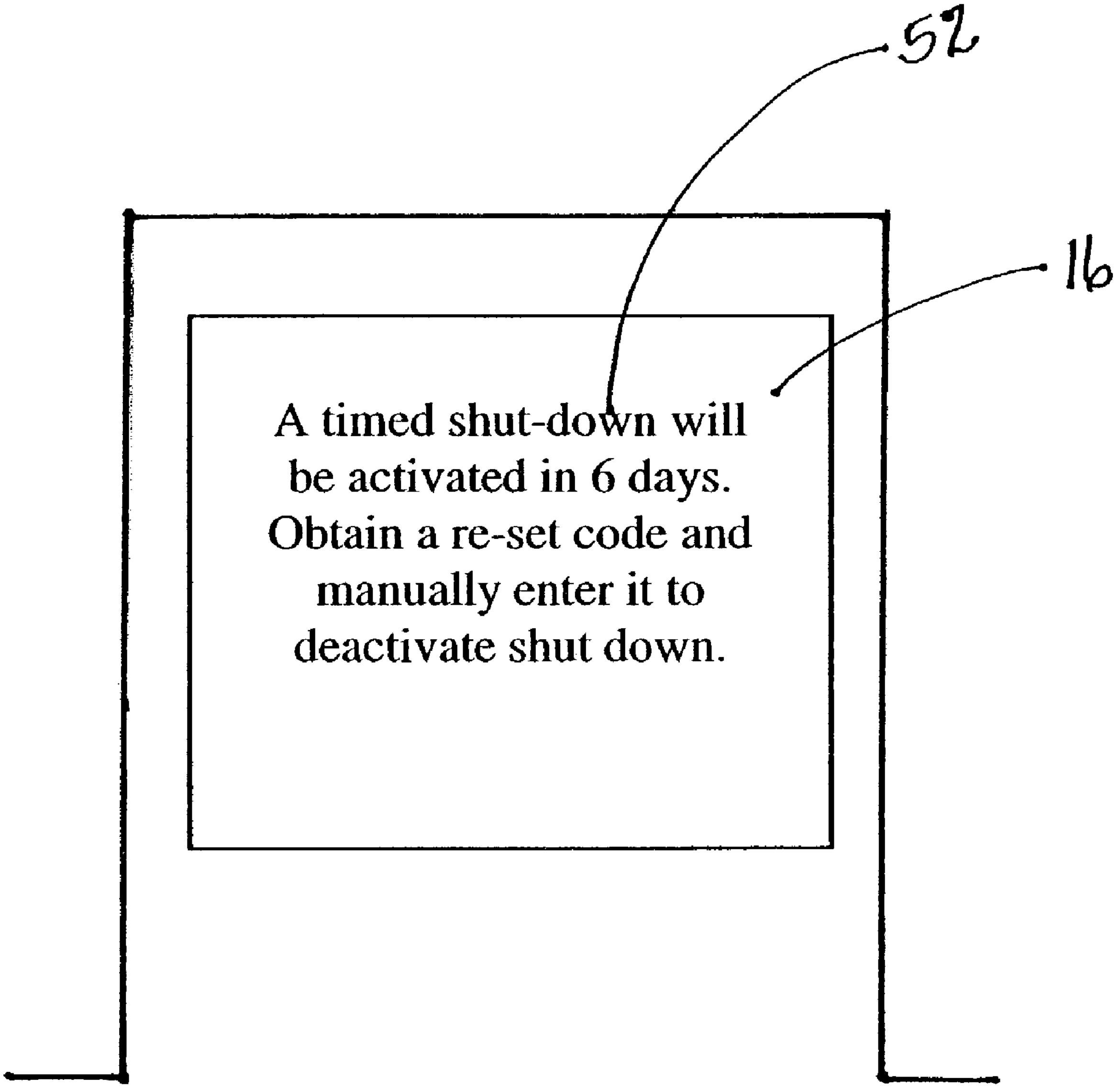

Within a pre-set time before the timed interval 36 ends, the display screen 16 (shown in FIGS. 1 and 3) visually displays a warning message to the user 15, as shown by reference numeral 50 in FIG. 4. The message advises that the machine will shut-down unless a re-set code 40 is entered into the machine. The message may include text and optionally the date on which machine will shut-down. In another embodiment, the message may be visually displayed as a different-colored screen with the shut-down date noted thereon, or as a colored block on a portion of display screen 16 with a text message. FIG. 6 shows one example of a screen message 52, instructing the user 15 to contact the equipment supplier for the re-set code 40 and to enter the re-set code 40 into the system 12. The message 52 need not, however, be solely visual in nature; e.g., it may include an auditory component.

The message 52 may appear on the display screen 16 at a pre-determined time—e.g., one week before the scheduled shut-down date. The message will be displayed until the machine shuts down or the timed shut-down is re-set by entry of the re-set code 40. In one embodiment, the message 52 may be displayed periodically at particular pre-set times; e.g., at one-hour intervals. In another embodiment, the message 52 may remain on the display screen 16 at all times until the timed interval 36 ends.

The user needs to obtain the system-generated re-set code 40 from the non-user 46, who has received or otherwise determined the system-generated re-set code 40. However, before the user may obtain the re-set code 40, the non-user 46 determines the status of the account from information provided by the financing entity holding the account or the management group retained to oversee the account, as shown by reference numeral 56. The account is checked to determine if payment associated with the present timed interval has been timely made and received. FIG. 4 shows this as step 57. In one embodiment, the financing entity bears responsibility of advising the non-user (who controls the re-set code) of the status of the account. For example, in such embodiment, as a default, if the financing entity provides no information to the non-user 46, the account may be deemed to be in an unpaid state—whether it is or is not. Therefore, if the non-user 46 has not been advised of the paid status of the account, the user 15 will be denied the re-set code 40. If the account is, in fact, in arrears, the user 15 will be denied the re-set code 40, as shown by reference number 64.

If the account is paid, the non-user 46 releases the system-generated re-set code 40 to the user, as shown by reference numeral 66. The step of releasing the re-set code includes confirming the user's identity, as shown by reference numeral 68. In this step, the non-user confirms the user's identity by checking at least two forms of identifying information, such as the serial number 70 on the machine. The non-user typically records the serial number at the time the account is set up. The actual count 17 from the total counter 14 (shown in FIG. 1) on the control center 10 may also be used for checking the user's identification. In a further embodiment, additional information may be requested.

To obtain the system-generated re-set code 40, the user 15 generally contacts the non-user 46. Alternatively, the user 15 may obtain the re-set code 40 by contacting a resource such as a website or a telephone line set up on behalf of the non-user 46. The step of obtaining the re-set code 40 is denoted by reference numeral 68. The re-set code 40 may be obtained via at least one means chosen from telephone 70, facsimile 72, email 74, the Internet by accessing a designated website 76, and any other suitable means. Typically, it is the equipment supplier that releases the re-set code to the user 15; however, there may be instances where the finance entity would release the re-set code.

After obtaining the system-generated re-set code 40, the user 15 manually enters a user-entered re-set code 40' into the control center 10 via the keypad 18 (shown in FIG. 1). FIG. 4 depicts this step as reference numeral 78.

Throughout the first timed interval 36, the controller 26 keeps track of the time remaining on the initial timed interval (this step is shown as reference number 80). The controller 26 checks to determine whether a re-set code was entered into control center 10 (shown as reference number 82).

If a re-set code 40' was entered into the control center 10, the controller 26 compares the user-entered re-set code 40' to the system-generated re-set code 40 stored in memory to determine whether the codes match, indicating that the correct code was, in fact, entered. FIG. 4 depicts this step with reference numeral 84. Entry of the correct re-set code 40' that is identical to the stored re-set code 40 initiates a new timed interval 86 or cycle, as shown by reference number 88, and allows the machine to remain operational. If the machine has already been shut-down, the re-set code 40' may be manually entered into the control center 10. Alternatively, the non-user may transmit the re-set code to the machine. Entry of the correct re-set code de-activates the shut-down, allowing the machine to be operated for the duration of the new timed interval 86.

If the user failed to enter the re-set code 40' into the machine, the controller 26 will check to determine if any code was entered (shown by reference number 90). If no code was entered, the controller 26 will trigger the program 32 to shut-down the machine 11. FIG. 4 shows this step as reference number 92.

The sequence described above repeats until the account is paid in full and the final balance due is zero dollars ($0). At that time, the user 15 must obtain a final code—also called a program termination code—which, when entered by the user into the keypad or on the touch screen, will de-activate the program 32 (until reactivated, if ever). This final code is also generated by the code generator. Generally, after the non-user 46 ascertains that the account is current as shown by reference numeral 57 in the non-user 14 "box," information is provided on the balance remaining on the account (designated by reference number 94). If the balance is zero ($0), the non-user 46 will provide the user 15 a final code 96. FIG. 4 shows this as reference number 98. The user then manually enters the final code 100, using the keypad or touch screen on the display 16 (shown in FIGS. 1 and 2). The controller 26 identifies the user-entered code as a final code and permanently deactivates the program (shown in FIG. 4 by reference numeral 102). If the balance owed on the account is greater than zero dollars ($0), the re-set code is released to the user for starting a new timed interval.

In certain embodiments, the sequence of steps may vary from that depicted in FIG. 4, although certain steps should follow the sequence shown. For example, with respect to the re-set code 40, the sequence remains as follows: generating the re-set code 40 by the code generator 28 (reference numeral 42), the non-user 46 obtains the re-set code (shown by reference numeral 48) by determining the re-set code or, alternatively, receiving the re-set code from the machine, and then the user obtaining the re-set code 40 from the non-user 46 (reference numeral 68). The warning message display step (reference numeral 50) may take place before the user obtains the re-set code; however, in alternative embodiments, the message display may follow the user's receipt of the re-set code. Similarly, the non-user may check on the payment status of the account (reference numerals 56-57) before or after the control center 10 generates or transmits the re-set code to the non-user.

Finally, it should be noted that the code generator is never turned off "permanently." It is always working in the system. In short, it is always living in the system in either the foreground (when the disabling program is activated) or in the background (when the disabling program is deactivated). The code generator is thus never "turned-off." When the disabling program is activated, the code generator is in the foreground and employed as described above, to ensure payments and to shut down the machine if need be. When the disabling program is deactivated, or not activated, the code generator is in the background and merely continues to run, generating codes that serve no particular purpose. As such, when the final code is entered into the system, the disabling program is turned off, or deactivated, and the code generator continues, moving from the foreground of the system to the background of the system. In this manner, the disabling program can be turned on and activated and turned off and deactivated throughout the life of the machine or equipment. Specifically, when a machine is resold, or refurbished or even repaired, the disabling program can be manually activated to ensure proper and timely payments. Thus, if a machine (already paid for) is resold, the disabling program can be activated to ensure payment by the second purchaser.

It is understood that, given the above description of the embodiments of the invention, various modifications may be made by one skilled in the art. Such modifications are intended to be encompassed by the claims below.

We claim:

1. A method for automatically rendering unusable operating functions of a machine in a user's custody, associated with a credit account, and having a system comprising (i) a controller having a code generator and a disabling program for activating a shut-down sequence; and (ii) an interface for entering a re-set code to set a new interval;

the method comprising:

(a) activating the disabling program to initiate a preselected interval associated with the credit account so that the machine will become disabled after the preselected interval if a re-set code generated by the code generator is not entered;

(b) upon a paid status of the credit account, releasing a remote re-set code to match the re-set code generated by the code generator from a location remote from the machine, the remote re-set code being generated at the remote location from a count corresponding to a tracked predetermined parameter and being transmitted to the remote location;

(c) entering the remote re-set code into the interface to set a next interval;

(d) receiving identifying information of the user at the remote location and confirming the identity of the user at the remote location before releasing the remote re-set code; and, (e) repeating steps (b)–(d) to keep the machine operational.

2. The method of claim 1 wherein the next interval is a time interval.

3. The method of claim 1 including advising the user that the machine will shut-down unless the remote re-set code is entered.

4. The method of claim 1 wherein the step of entering the remote re-set code is performed manually by entering the remote re-set code into the interface for setting the next interval.

5. The method of claim 4 wherein the step of manually entering the remote re-set code is accomplished on the interface chosen from the group consisting of a keypad and a touch screen.

6. The method of claim 1 wherein the count is a number of cycles performed by the machine.

7. The method of claim 1 wherein the step of releasing the remote re-set code is accomplished by at least one means selected from the group consisting of a telephone, a facsimile, an email, and the Internet.

8. The method of claim 1 wherein step (d) is repeated until the credit account has a zero balance due.

9. The method of claim 1 further comprising entering a final code for deactivating the disabling program.

10. The method of claim 1 wherein the step of activating the disabling program is for initiating a timed interval for a printing machine.

11. The method of claim 1 wherein the step of activating the disabling program is for initiating a timed interval for a screen printing machine.

12. A method for automatically rendering unusable a machine in a user's custody upon an unpaid balance of an account associated with a use or a purchase of the machine, where the machine is connected to a system having a control center comprising a user interface for entering a code, and, a controller having a code generator and a shut-down program for shutting the machine down at the end of an interval unless a correct code is entered into the control center;

the method comprising (a) activating the shut-down program to initiate an interval so that the machine will become disabled after the preselected interval if a re-set code generated by the code generator is not entered, (b) at a defined point during the interval, determining that the account has a paid status, (c) depending upon the paid status of the account, releasing a code selected from the group consisting of (i) a remote re-set code to match the re-set code generated by the code generator when the account has a balance due for initiating a new interval, the remote re-set code being generated at the remote location from a count corresponding to a tracked predetermined parameter and being transmitted to the remote location and (ii) a final code when the account has a zero balance due for disabling the shut-down program.

(d) entering the code into the user interface, (e) receiving identifying information of the user at the remote location and confirming the identity of the user at the remote location before releasing the remote re-set code; and, (f) if the code entered in step (d) was a re-set code and the identifying information of the user confirms the identity of the user, repeating steps (b)–(e) until the account has a zero balance.

13. The method of claim 12 wherein the interval is a time interval.

14. The method of claim 12 further comprising displaying a warning message to the user advising that the machine will be shut-down.

15. The method of claim 14 wherein the re-set code released in step (c) is generated by a digital algorithm.

16. The method of claim 12 wherein the non-user is selected from the group consisting of an equipment supplier, a financing entity, and an account manager.

17. The method of claim 12 wherein the step of releasing the code is conducted by at least one means chosen from a telephone, a facsimile, an email, and the Internet.

18. The method of claim 12 wherein the step of checking the user's identity includes checking at least two forms of identifying information of the user.

19. The method of claim 12 wherein the step of activating the shut-down program is for a printing machine.

20. A method for automatically shutting down a machine when a credit account associated with a purchase or a lease of the machine falls into arrears;

wherein the machine is connected to a control center of a shut-down system comprising a user interface for entering a re-set code to keep the machine operational, and a controller having a disabling program awaiting activation for triggering a timed sequence shut-down, a code generator, and means for monitoring a timed interval preceding the timed sequence shut-down;

the method comprising:

(a) activating the disabling program to shut the machine down after the timed interval if a re-set code generated by the code generator is not entered, (b) generating a remote re-set code at the remote location from a count corresponding to a tracked predetermined parameter and transmitted to the remote location;

(c) transmitting a re-set code generated by the code generator to a non-user at a location remote from the machine, (d) transmitting identifying information of the user to the remote location and confirming the identity of the user at the remote location before releasing the remote re-set code; and, (e) at a defined point in the timed interval, triggering the timed sequence shut-down unless a code is entered into the user interface to initiate a new timed interval and the confirming identifying information is received, wherein the code is obtained from the non-user upon the credit account having a paid status for the timed interval.

21. The method of claim 20 further comprising:

(a) receiving the remote re-set code obtained from the non-user entered via the user interface, and, (b) comparing the user-entered re-set code against the re-set code generated by the code generator to determine if a correct code was entered.

22. The method of claim 21 further comprising receiving a final code entered via the user interface for deactivating the disabling program.

23. The method of claim 21 wherein the step of activating the disabling program is conducted for a printing machine.

24. A system for ensuring that payments are made on a timely and regular basis to an account for a purchase or a leasing of a machine, comprising:

means for checking on a payment status of the account; and, a control center connected to the machine and having a display screen for displaying a message, a user interface for entering a code into the machine, and a controller for controlling the operation of the machine;

means for receiving an input transmission of identifying information of the user to confirm the identity of the user;

the controller including a timed shut-down program for rendering the machine unusable after a first timed interval when the account associated with the machine falls in arrears, means for monitoring the timed interval, and a code generator for generating a re-set code for entering into the user interface so as to initiate a new timed interval, the re-set code being generated at the remote location from a count corresponding to a tracked predetermined parameter.

25. The system of claim 24 wherein the user interface comprises a device chosen from the group consisting of a keypad and a touch screen.

26. The system of claim 24 further including auditory means for informing a user that the machine will shut-down after the first timed interval.

27. The system of claim 24 further comprising means for transmitting the generated re-set code to a non-user at a location remote from the machine.

28. The system of claim 27 wherein the non-user is selected from the group consisting of an equipment supplier, a financing entity, and an account manager.

29. The system of claim 27 further comprising means for the non-user to release the generated re-set code to a user for entry into the machine.

30. The system of claim 29 wherein the means for the non-user to release the generated re-set code to the user comprises at least one means selected from the group consisting of a telephone, a facsimile, an email, and the Internet.

31. The system of claim 24 further comprising means for comparing a re-set code entered into the machine to the generated re-set code to determine whether a correct re-set code was entered.

32. The system of claim 24 wherein the machine is a printing machine.

33. The system of claim 32 wherein the machine is a screen printing machine.

* * * * *